Sept. 5, 1950      G. B. ROLFE      2,521,254
PERMANENT MAGNET GENERATOR SYSTEM

Filed Nov. 4, 1947      3 Sheets-Sheet 1

Inventor
George B. Rolfe
By
Ralph B. Stewart
Attorney

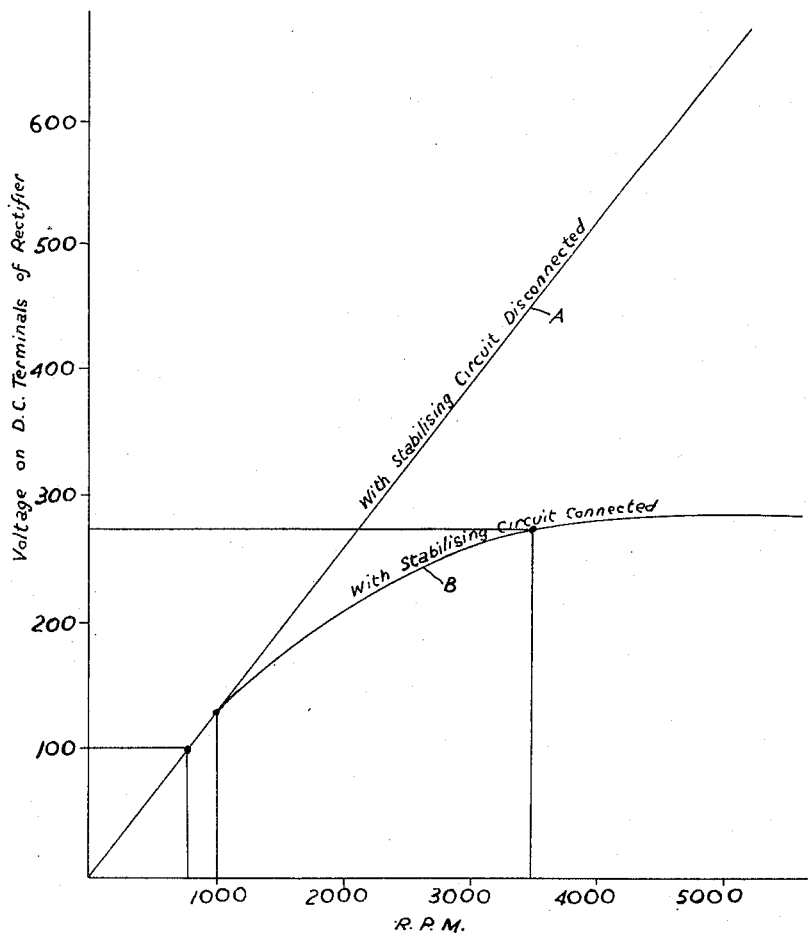

Sept. 5, 1950   G. B. ROLFE   2,521,254
PERMANENT MAGNET GENERATOR SYSTEM
Filed Nov. 4, 1947   3 Sheets-Sheet 3
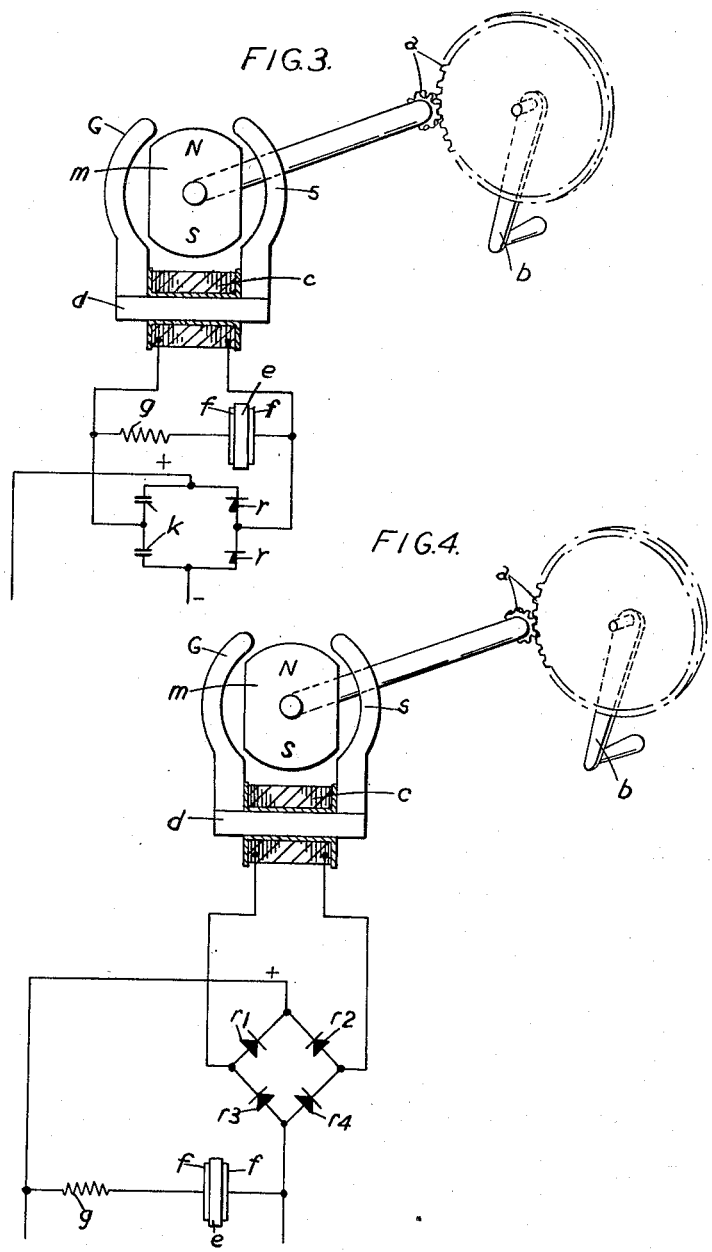
Inventor
George B. Rolfe
By
Ralph B. Stewart
Attorney Patented Sept. 5, 1950

2,521,254

UNITED STATES PATENT OFFICE 2,521,254

PERMANENT MAGNET GENERATOR SYSTEM

George Berkeley Rolfe, Chiswick, London, England, assignor to Evershed & Vignoles Limited, London, England, a British company Application November 4, 1947, Serial No. 783,998
In Great Britain November 23, 1946

2 Claims. (Cl. 322—95)

This invention relates to instruments for measuring high resistance in which an electrical generator is provided and which is usually hand-driven. Such instruments are usually suitable for the measuring of insulation resistance.

The object of the invention is to provide such an instrument including an alternating current generator which is simple in construction and therefore relatively cheap to produce and yet can be made compact and of small size.

Resistance measuring instruments with a built-in generator usually have a permanent magnetic field so that the voltage increases with the speed at which the machine is driven. In the most usual form, such instruments are fitted with a slipping clutch which operates at a predetermined speed, so that when the handle is rotated at that speed or at a higher speed, the generator is driven at a speed which is substantially constant.

When an alternating current generator is employed, a number of means of producing a constant voltage output are conveniently available. For example, circuits having correcting characteristics may be connected to the output terminals of the generator and may include shunt resistances or condensers. However, as such machines are generally employed with direct current measuring or indicating instruments, such as moving coil instruments, it is necessary to employ a rotary or static rectifier to yield an unidirectional output. The present invention deals with the problem by controlling the voltage obtained from such a rectifier.

Thus according to this invention, the alternator terminals or the output from the rectifier are shunted by a resistance which has the characteristic of decreasing in value with increase in the voltage applied to it. Such resistances are available in the form of solid blocks or plates of silicon carbide which have an admittance which varies as a power of the applied voltage. Such resistance may be used alone or in a series or parallel with an ordinary resistance of constant value.

A convenient form of the novel instrument may be furnished with a small current generator having a rotatable permanent field magnet connected to a crank handle and a stationary armature winding. The magnet may be of one of the modern magnetic steels of high coercive force.

The invention will now be more fully explained by describing some examples of instruments in accordance therewith with reference to the accompanying drawings, in which:

Figure 2 is a voltage-speed characteristic diagram of the instrument shown in Figure 1;

Figure 3 is a circuit diagram of a modified form of instrument; and

Figure 4 is a similar diagram of yet another form.

Figure 1:
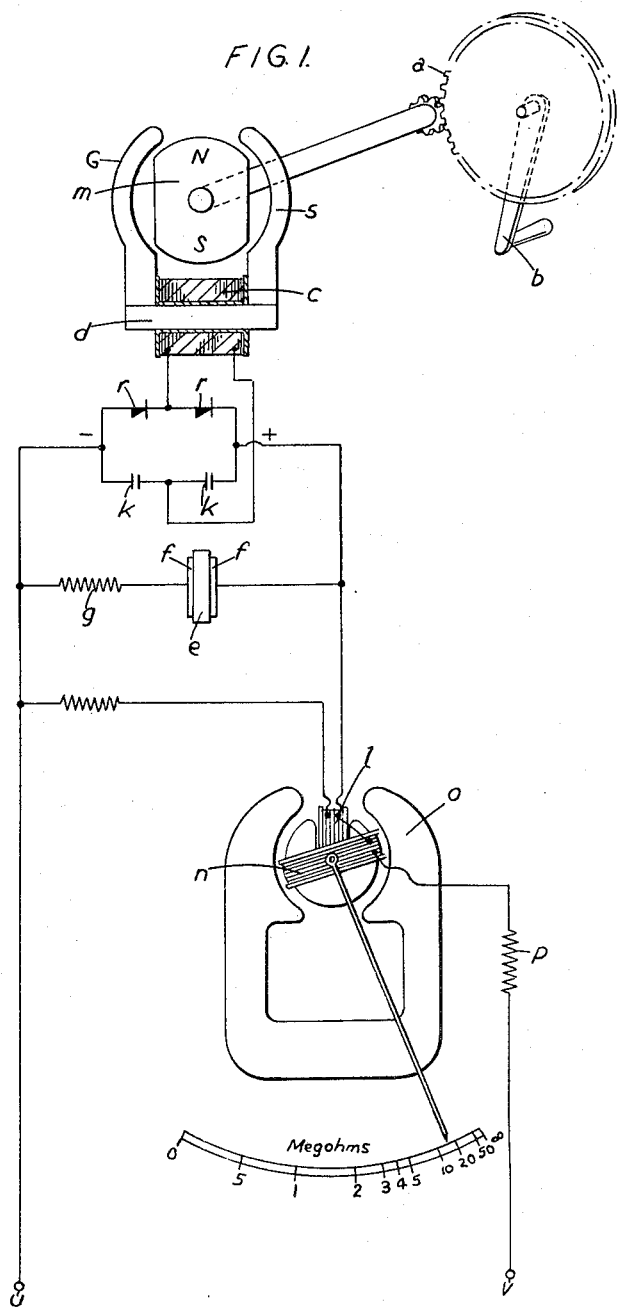
Figure 1 is a circuit diagram of one form of the instrument.

In Figure 1, the instrument comprises a small current generator G having a rotatable permanent field magnet $m$ driven through gearing $a$ by a crank handle $b$ and also having a stationary armature or inductor winding $c$. In this particular example, the generator G which is suitable for use in a portable insulation tester in which lightness and compactness are desirable and the normal speed of the rotor is therefore high, i. e. 4000 revolutions per minute, is provided with the magnet $m$ of a magnet alloy of iron, aluminium, nickel and cobalt having a high coercive force. This rotor is 1¼ inches in diameter and 1 inch axial length and is magnetised so that the lines of force are at right angles to its axis of rotation and form opposite poles N and S at the ends of a diameter. The stator or armature $s$ is of horseshoe form with its pole-shoes embracing the rotor $m$ and providing an air gap of a length of 0.0075 inches. The armature winding $c$ embraces a laminated yoke $d$ having a cross-section of 1 inch by ⅜ inch and consists of a coil having 6000 turns of insulated copper wire of 0.0036 inches diameter and having a total resistance of 1430 ohms.

The alternating voltage generated by this machine is rectified by a voltage-doubling rectifier consisting of two half-wave copper oxide rectifiers $r$ connected in series in a path across a pair of output terminals A and B and two condensers $k$ connected in series in another path across terminals A and B, each condenser having a capacity of 0.5 mfds. One terminal of inductor coil C is connected to the mid-point of the rectifier path and the other coil terminal is connected to the mid-point of the condenser path. The stabilising circuit consists of a disc $e$ of a silicon carbide composition such as is obtainable on the market and which is mounted between two electrodes $f$ in series with resistance $g$ of 4700 ohms, the whole being connected across the terminals A and B. The silicon carbide composition of the disc $e$ is such that the voltage between the electrodes $f$ varies as the 0.22 power of the current flowing through the disc $e$. The dimensions of the latter are such that when a direct current of 12 milliamperes flows through it, the potential drop across it is 230 volts. At this current value the disc $e$ has a resistance of approximately 20,000 ohms.

In the absence of the stabilising connection $e, f, g$, the curve of unidirectional voltage plotted against the speed of the rotor $m$ is a straight line passing through the origin and having a slope of 100 volts per 750 revolutions per minute as shown by the curve A in Figure 2. When, however, the stabilising connection is connected as shown in Figure 1, the curve changes into the form shown at B in Figure 2. Thus when a speed of 1000 revolutions per minute is reached, the curve begins to depart from the straight line A, gradually becoming flatter until at about a speed of 3,500 revolutions per minute, it becomes approximately flat at 275 volts and further increase of speed gives substantially no further increase of voltage.

The output terminals A and B are connected through a control resistance $h$ across the control coil $l$ of a crossed-coil or ratiometer type of ohmmeter O and are also connected in series with the deflecting coil $n$ of the ohmmeter, a deflecting-circuit resistance $p$ and the terminals $u$, $v$ of the instrument to which the resistance to be measured is connected.

In the alternative form shown in Figure 3, the stabilising branch circuit $e$, $f$, $g$ is connected directly across the terminals of the alternator G. Otherwise, the circuit is the same as in Figure 1 and the same reference characters have been applied to corresponding parts.

In Figure 4, the arrangement is as in Figure 1, except that the voltage-doubling rectifier $r$, $k$ is replaced by a full-wave rectifier $r1$, $r2$, $r3$, $r4$. The voltage-doubler provided in Figure 1, is, however, preferred because it gives a direct current output with a smoother wave-form.

I claim:

1. In combination, a variable speed alternating current generator operable over a predetermined range of speed for generating an open circuit output voltage which varies in magnitude in accordance with the speed of operation thereof, said generator being provided with an inductor winding having appreciable self-induction and a resistance value of the order of 1000 ohms, and means for maintaining the output of said generator substantially constant over the upper portion of said speed range comprising a shunt path connected across the output of said generator including a fixed resistor having a value of the order of 4000 ohms and a second resistor formed solely of a silicon carbide composition connected in said shunt path and having a resistance value dependent upon the current flowing therein such that the voltage developed across said second resistor varies approximately as the 0.22 power of the current, said second resistor having a resistance value of substantially 20,000 ohms when the applied voltage is of the order of 230 volts.

2. In combination, an alternating current generator having an inductor winding, said generator being of the hand-driven type operable over a predetermined range of speed to produce at the terminals of said winding an open-circuit voltage which varies in magnitude in proportion to the speed of operation, a pair of output terminals, a rectifier connecting said inductor winding to said output terminals, and a shunt path connected across said output terminals of said rectifier and including a resistor formed solely of a silicon carbide composition which decreases in resistance with increase in voltage applied thereto and serving to maintain a substantially constant voltage across said output terminals over the upper portion of said speed range.

GEORGE BERKELEY ROLFE.

REFERENCES CITED

The following references are of record in the file of this patent:

UNITED STATES PATENTS

| Number | Name | Date |
|--------|------|------|
| 1,094,732 | Lyle | Apr. 28, 1914 |
| 1,816,748 | Romain | July 28, 1931 |
| 2,460,095 | Love | Jan. 25, 1949 |